June 13, 1967 R. E. BOWLES 3,324,730
FLUID-OPERATED ACCELEROMETER
Filed July 31, 1964

INVENTOR
ROMALD E. BOWLES

BY *Hurvitz & Rose*

ATTORNEYS

United States Patent Office 3,324,730
Patented June 13, 1967

3,324,730
FLUID-OPERATED ACCELEROMETER
Romald E. Bowles, Silver Spring, Md., assignor to Bowles Engineering Corporation, Silver Spring, Md., a corporation of Maryland
Filed July 31, 1964, Ser. No. 386,688
7 Claims. (Cl. 73—515)

The present invention relates to accelerometers and, more particularly, to a range-switching accelerometer employing pure fluid elements.

It is an object of the present invention to employ a plurality of streams of fluid, such as air, to sense the position of a stream of more dense fluid, such as water, each of the streams of less dense fluid sensing the position of the stream of more dense fluid over a different predetermined range of positions.

It is another object of the present invention to provide a plurality of fluid amplifiers for monitoring the position of a stream of fluid wherein each amplifier receives a variable pressure input signal from a pressurized tube, the pressure in which varies with variations of impedance to flow therefrom as a function of the position of the stream relative to the end of the tube, the ends of the various tubes being positioned such that each amplifier monitors the movement of the stream over a different predetermined range of movements.

Still another object of the present invention is to provide an accelerometer employing a plurality of fluid amplifiers, each of the amplifiers receiving an input signal as a function of the position of a fluid stream relative to the end of a tube containing a pressurized, less dense fluid, the position of the more dense fluid stream varying as a function of acceleration of the nozzle from which the dense fluid stream issues and, in varying the stream's position relative to the end of the tube, presenting a varying impedance to flow of fluid from the tube and therefore controlling the pressure within the tube, each of the tubes being positioned to sense movement of the more dense stream over a different predetermined range of movements and the output signals developed by the amplifiers being interrelated so as to provide either a digital or a continuously variable analog indication of the position of the stream.

The above and still further objects, features and advantages of the present invention will become apparent upon consideration of the following detailed description of one specific embodiment thereof, especially when taken in conjunction with the accompanying drawings, wherein.

Figure 1:
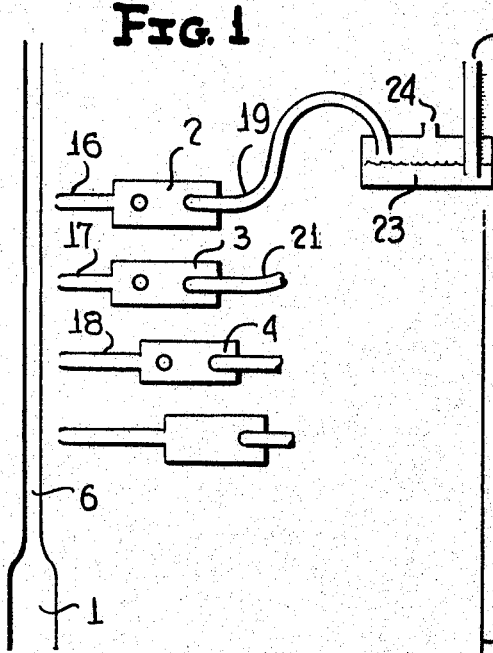
FIGURE 1 is a schematic illustration of the interrelationship between various fluid amplifiers and the stream of acceleration-responsive fluid.

Referring now specifically to FIGURE 1 of the accompanying drawings, there is illustrated a nozzle 1 for issuing a stream of relatively dense fluid; that is, a fluid which is dense relative to operating fluid employed by a plurality of the fluid amplifiers 2, 3, 4, etc. The nozzle 1 and the fluid amplifiers 2–4 are secured to some physical object (not illustrated) whose linear acceleration or angular velocity is to be measured. In the simple arrangement illustrated in FIGURE 1, if the body, to which the nozzle and amplifiers are attached, is accelerated to the left, a stream of fluid 6 issued by nozzle 1 appears to approach the amplifiers 2–4. Also, if the body to which the nozzle and amplifiers are attached is rotated, the stream 6 appears to follow a curved path, this being known as the Coriolis effect. If rotation is counterclockwise, for instance, the stream 6 is curved clockwise; that is, towards the amplifiers 2, 3 and 4.

Figure 2:
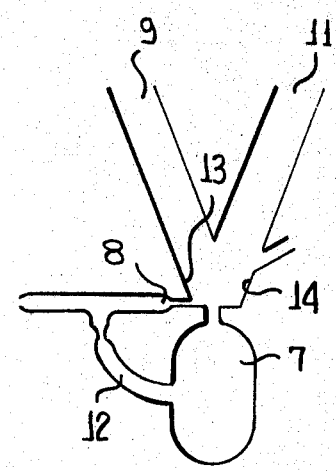
FIGURE 2 is a top view of one of the fluid amplifiers employed in FIGURE 1.

In order to more fully understand the specific operation of the apparatus, as illustrated in FIGURE 1, reference is made to FIGURE 2 of the accompanying drawings which illustrates a specific type of amplifier arrangement which may be employed as the amplifiers 2, 3 and 4 of FIGURE 1.

FIGURE 2 illustrates a fluid amplifier having a power nozzle 7, a control passage 8, and a pair of output channels 9 and 11. The control passage 8 is relatively small and is supplied with pressurized fluid from the power nozzle 7 via a restrictive passage 12. The amplifier is asymmetrical in that a left sidewall 13, through which the control passage 8 extends, is closer to the centerline of the nozzle 7 than a right sidewall 14. In the absence of an increase in pressures in the passage 8, in a manner to be described immediately below, all of the fluid issuing from the nozzle 7 is directed, due to boundary layer effects, to the output channel 9. As the pressure in the passage 8, and therefore flow therefrom into the amplifier, is increased, the fluid from the nozzle 7 is proportionally deflected to the right so that increasing quantities of fluid enter the output passage 11 as a function of increasing pressure in the passage 8.

The pressure in the passage 8 is varied as a function of variations in impedance to outflow of fluid from the left end, as viewed in FIGURE 2, of the passage 8. Thus, if the passage is completely blocked by placing a solid object over its end, the pressure in the passage 8 rises to a large value, all fluid entering the passage through the channel 12 flows through the passage 8 into the amplifier and all fluid issuing from the nozzle 7 flows to the output passage 11. Actually, the amplifier is designed so that all fluid is switched to the output passage 11 upon a predetermined degree of blockage of the end of the tube 8 less than complete blockage thereof.

Variable blockage of the ends of the passage 8 is effected in the present invention by the stream 6 of FIGURE 1. More particularly, the stream 6 is of a fluid considerably more dense than the fluid employed in the amplifier. A water and air combination is satisfactory and inexpensive. The water, so far as the less dense air in passage 8 is concerned, appears as a substantially solid barrier so that the impedance to air flow out of the end of passage 8 varies as a function of the position of the stream 6. In order for this effect to take place, the cross-sectional dimension of the tube 8 should be small compared with the corresponding dimensions of the stream presented to the tube.

Also, the stream 6 should be a laminar stream to minimize entrainment of the surrounding medium and to minimize signal noise. Air flow out of the passage 8 must be at a greater rate than the local entrainment characteristics of the stream 6 so that the stream 6 does not draw fluid out of the passage 8 but rather impedes its outward flow. Further, the tube is preferably of such a size as to affect as little as possible, within reason, the flow characteristics of the stream 6. Under these conditions, the stream 6 appears as a barrier or impedance to egress of fluid from the pasasge 8 which impedance varies with position of the stream.

Referring again to FIGURE 1 of the accompanying drawings, the amplifiers 2, 3 and 4 are provided with control passages 16, 17 and 18, respectively. Each of the passages 16–18 terminates at a distance from the fluid stream 6 which increase as a function of increasing ranges of accelerations over which the various amplifiers are to operate. More particularly, the higher the acceleration, the larger the angle through which the stream is deflected. By placing the sensing tubes of amplifiers 2–4 such that each is affected by movement of the stream 6 through a different range of angles of deflection, each amplifier senses a different range of accelerations.

The tube 16 is positioned such that, when the stream 6 is undeflected, the stream is at the limit of the range of positions over which it may affect the pressures in the tube 16. Thus, if the stream 6 is deflected away from the tube 16, the output flow from amplifier 2 is unaffected whereas, if the stream 6 is deflected toward the tube 16, the output flow from amplifier 2 increases. The tube 17 is positioned either by positioning it closer to the nozzle 1 or by setting it back from the stream 6 such that the stream 6 does not begin to affect the pressure therein until all of the fluid issued by the power nozzle of the amplifier 2 is deflected to the channel 19. Similarly, the tube 18 is positioned such that the pressure therein is not affected until the power stream of the amplifier 3 of FIGURE 1 is completely deflected to its output passage 21.

It will be noted that, in the arrangement thus far described relative to FIGURE 1, the apparatus can sense acceleration of only one sense; that is, linear acceleration toward the left as viewed in FIGURE 1 or counter-clockwise rotation. By placing a second plurality of devices on the left side of the stream, which devices constitute a mirror image of the apparatus on the right side, it is possible to sense acceleration in either of the two possible senses. Also, by placing sensing apparatus at 90° relative to each other about the stream 6, it is possible to sense acceleration or combinations thereof in all directions except components of linear accelerations along the axis of the nozzle 1 and therefore of the stream 6 or components of angular rotation about the axis of nozzle 1.

The type of indication provided by the system of the present invention may be either digital or analog. In FIGURE 1, there is illustrated one method of providing a visual indication. More particularly, the visual indication is the height of a column of colored fluid in a tube designated by the reference numeral 21. The tube extends into a closed chamber 22 having a liquid 23 disposed therein. The liquid is preferably colored. The output tube 19 of the amplifier 2 enters the chamber 22 and terminates above the normal level of the liquid 23. A bleed or vent 24 is provided so as to permit the pressure in the chamber 22 to fluctuate as a function of fluid flow through the tube 19. Thus, the height of liquid in the column 21 is a function of the rate of supply of fluid to the chamber which, in turn, is a function of the acceleration to which the stream 6 is subjected. When the stream 6 is deflected sufficiently so that it passes beyond the end of the tube 16, the fluid in the tube 21 falls back to its normal level but the level of the liquid in the tube associated with amplifier 3 rises. Subsequently, if accelerations are high enough, the fluid in the tube of the apparatus associated with the amplifier 4 rises in its tube. Thus, by reading the appropriate tube, it is possible to determine the exact acceleration at any moment. This technique provides the same degree of sensitivity throughout the range of accelerations covered by amplifiers 2, 3, 4, etc., and is more sensitive than the case of a single analog output device of conventional design.

The display apparatus of FIGURE 1 is acceleration responsive and, if the display apparatus cannot be conveniently mounted in a direction along which acceleration forces will not be developed or placed on an acceleration insensitive mount, other display devices should be employed. Devices fulfilling this purpose and which may be connected to the passage 19 of FIGURE 1 are bellows, Bourdon tubes, diaphragms, etc.

Figure 3:
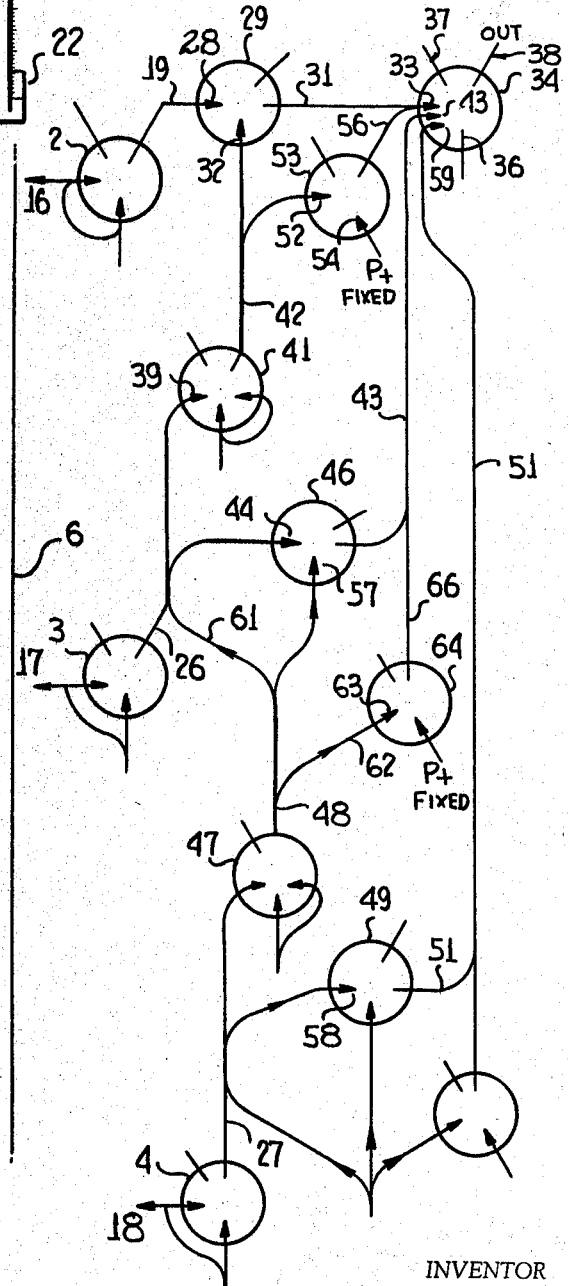
FIGURE 3 is a schematic diagram of the various fluid elements employed for effecting an analog signal which varies over a continuous range as a function of deflection of the acceleration-responsive stream.

If it is wished to provide a continuous proportional indication of the deflection of the stream 6 then the apparatus of FIGURE 3 may be employed. Those elements of FIGURE 3 which correspond to elements of FIGURE 1 are designated by the same reference numerals as in the latter figure. The amplifiers 3 and 4 are provided with output channels 26 and 27, respectively. Output channel 19 of the amplifier 2 is connected to a power nozzle 28 of a nor-gate 29 having an output signal channel 31 and a control nozzle 32. The signal channel 31 is connected to a control nozzle 33 of a proportional amplifier 34 having a power nozzle 36, and output channels 37 and 38.

When the acceleration of the stream 6 is sufficient to affect amplifier 2, the signals generated thereby in the output channel 19 are directed to the output signal channel 31 of the nor-gate 29 and thence to the control nozzle 33 of the proportional amplifier 34. The output signal developed in the output channel 38 is a function of the output signal appearing in the channel 19 and therefore is a function of the degree of deflection of the stream 6 of FIGURE 1 relative to the sensing tube 16. Amplifier 34 is operable over quite an extended range so that, when all of the fluid of the amplifier 2 is directed to the output channel 19, only a relatively small portion, such as a sixth or an eighth of the fluid issued by the power nozzle 36 of the amplifier 34, is directed to the output channel 38.

Output channel 26 of the amplifier 3 is branched so that a small portion of the fluid in the channel is directed to a control nozzle 39 of a high-gain fluid amplifier 41. Fluid amplifier 41 has an output channel 42 connected to control nozzle 32 of the nor-gate 29. The gain of the amplifier 41 is such that, upon the amplifier 3 becoming active; that is, upon a small portion of its fluid being directed to its output passage 26, the fluid from the output channel 19 of the amplifier 2 is deflected completely from the passage 31 so that the signal generated by the amplifier 2 no longer have any effect upon the output fluid flowing in the passage 38 and the amplifier 34.

The output channel 42 of amplifier 41 is branched to provide flow to a control nozzle 52 of a second high-gain amplifier 53 having a power nozzle 54 and an output channel 56 connected to control nozzle 33 of amplifier 34. The power nozzle 54 is connected to a source of fixed pressure. The amplifier 53 is such that, when the power stream is switched to passage 56, the same signal is applied to control nozzle 33 as when the signal produced by amplifier 2 is a maximum. Also, the amplifier 53 is switched to output passage 56 when the nor-gate 29 has its stream switched away from passage 31. Thus, the output signal developed by amplifier 2 is removed from the system when the amplifier 3 begins to respond to the acceleration-deflected stream and the signal produced by amplifier 2 is replaced by an equal signal produced by amplifier 53, thereby providing a smooth transition from amplifier 2 to amplifier 3.

The output channel 27 of the amplifier 4 has a small portion of its fluid directed to a high-gain amplifier 47 having an output channel 48 connected to a control nozzle 57 of the nor-gate 46. The output channel 27 is also connected to a control nozzle 58 of another nor-gate 49 having an output channel 51 connected to a further control nozzle 59 of the amplifier 34. The output channel 48 of high-gain amplifier is also connected via passages 61 and 62 to output passage 26 of amplifier 3 and a control nozzle 63 of another high-gain amplifier 64, respectively. The fluid supplied to passage 61 maintains an input signal to amplifier 41 even after the acceleration-responsive stream 6 has been deflected beyond the end of the sensing tube of amplifier 3. Thus, the condition of devices 41, 53 and 29 are not altered.

The high-gain amplifier 64 serves the same function as amplifier 53. Thus, when a signal of sufficient intensity to switch nor-gate 46 is developed by amplifier 47, the amplifier 64 supplies to passage 43 via its output channel 66, a signal equal to that just removed from passage 43 due to switching of the nor-gate 46.

The above apparatus may be further cascaded as indicated by passages 67, 68 and 69 and amplifier 71 to accept further signals from still further amplifiers of the type of amplifiers 2, 3 and 4.

As a result of the above operation, the output signal from the passage 38 of the amplifier 34 is a continuous function of the deflection of stream 6. The circuit of FIGURE 3 effectively provides a range switching function by bringing into operation at various times, the amplifiers 53 and 64.

The apparatus has been described in conjunction with three sensing amplifiers 2, 3 and 4. A fourth amplifier is deliberately illustrated in FIGURE 1 to establish the fact that any number of amplifiers may be employed for sensing deflection of stream 6, the number employed depending upon the range over which operation is to be effected. It also is to be understood that any of the amplifiers of FIGURE 3 may be two or more amplifiers; that is, amplifiers 34, 41, 47, 53 and 64 may comprise plural cascaded amplifiers having a total gain necessary to achieve the desired performance.

While I have described and illustrated one specific embodiment of my invention, it will be clear that variations of the details of construction which are specifically illustrated and described may be resorted to without departing from the true spirit and scope of the invention as defined in the appended claims.

What I claim is:
1. An accelerometer comprising:
   a plurality of fluid amplifiers each having a power nozzle for issuing a first stream of fluid, a control nozzle for developing a control signal and an output passage capable of receiving said first stream of fluid;
   a plurality of fluid passages each connected to a different one of said control nozzles and having an open end remote from said control nozzle;
   means for supplying pressurized fluid to each of said fluid passages;
   each of said first streams of fluid being directed away from said output passage of its associated amplifier in the absence of blockage of said remote end of its associated fluid passage;
   means for issuing a second stream of fluid;
   said remote ends of said fluid passages being disposed along the length of said second stream of fluid and positioned such that fluid flow from each of said remote ends of said fluid passages is substantially unaffected when said second stream of fluid is undeflected and is successively impeded as said second stream is deflected toward said remote ends.

2. An accelerometer comprising:
   a plurality of fluid amplifiers each having a power nozzle for issuing a first stream of fluid, a control nozzle for developing a control signal, and an output passage capable of receiving said first stream of fluid;
   a plurality of fluid passages each connected to a different one of said control nozzles and having an open end remote from said control nozzle;
   means for supplying pressurized fluid to each of said fluid passages;
   each of said first streams of fluid being directed away from said output passage of its associated amplifier in the absence of blockage of said remote end of its associated fluid passage;
   means for issuing a second stream of fluid;
   said remote ends of said fluid passages being disposed along the length of said second stream of fluid and displaced therefrom such that fluid flow from said open ends is unaffected when said second stream is undeflected and fluid flows therefrom are successively and increasingly impeded over a predetermined range of deflection of said second stream toward said open ends of said fluid passages; and
   readout means for determining fluid flow to each of said output passages of said fluid amplifiers.

3. The combination according to claim 2 wherein the open ends of said fluid passages are disposed such that said first stream of fluid of one of said amplifiers is approximately completely deflected to its associated output passage before said first fluid stream of another of said amplifiers is deflected from its initial position.

4. The combination according to claim 2 wherein said readout means includes means providing a distinct indication of fluid flow conditions in each of said amplifiers.

5. The combination according to claim 2 wherein said remote ends of said fluid passages are spaced equal distances from one another parallel to the undeflected axis of said second stream of fluid.

6. The combination according to claim 2 wherein said readout means includes means providing a signal that is a continuously variable function of the position of said second stream.

7. The combination according to claim 6 wherein said last-mentioned means includes:
   a summing fluid amplifier having fluid signal input means;
   means applying output fluid signals from at least first and second of said fluid amplifiers to said summing amplifier; and
   means responsive to a second of said fluid amplifiers developing fluid flow to its output channel for disconnecting said output signal from a first of said fluid amplifiers from said summing amplifier and applying to said fluid signal input means of said summing amplifier a fluid signal substantially equal to the maximum signal developed by said first amplifier.

No references cited.

RICHARD C. QUEISSER, *Primary Examiner.*
J. J. GILL, *Assistant Examiner.*